(12) United States Patent
Liu et al.

(10) Patent No.: US 10,938,756 B2
(45) Date of Patent: Mar. 2, 2021

(54) TASK MANAGEMENT BASED ON INSTANT MESSAGE

(71) Applicant: BEIJING SANKUAI ONLINE TECHNOLOGY CO., LTD, Beijing (CN)

(72) Inventors: Pingchuan Liu, Beijing (CN); Yang Chong, Beijing (CN); Xuan Li, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/343,612

(22) PCT Filed: Oct. 20, 2017

(86) PCT No.: PCT/CN2017/106987
§ 371 (c)(1),
(2) Date: Apr. 19, 2019

(87) PCT Pub. No.: WO2018/072741
PCT Pub. Date: Apr. 26, 2018

(65) Prior Publication Data
US 2020/0059444 A1 Feb. 20, 2020

(30) Foreign Application Priority Data

Oct. 21, 2016 (CN) .................. 201610921306.X (51) Int. Cl.
*H04L 12/58* (2006.01)
*G06F 3/0481* (2013.01)
*G06Q 10/10* (2012.01)

(52) U.S. Cl.
CPC .......... *H04L 51/046* (2013.01); *G06F 3/0481* (2013.01); *G06Q 10/107* (2013.01); *H04L 51/043* (2013.01)

(58) Field of Classification Search
CPC ... H04L 51/046; H04L 51/043; G06F 3/0481; G06Q 10/107
See application file for complete search history.

(56) References Cited

U.S. PATENT DOCUMENTS

| 8,972,495 B1 * | 3/2015 | Borna | .................. H04L 51/08 |
|---|---|---|---|
| | | | 709/204 |
| 2008/0209417 A1 * | 8/2008 | Jakobson | ............ G06F 9/4856 |
| | | | 718/100 |

(Continued)

FOREIGN PATENT DOCUMENTS

| CN | 101075174 A | 11/2007 |
|---|---|---|
| CN | 101179522 A | 5/2008 |

(Continued)

OTHER PUBLICATIONS

European Patent Office, Extended European Search Report Issued in Application No. 17861272.7, dated Jun. 27, 2019, Germany, 8 pages.

(Continued)

*Primary Examiner* — Chris Parry
*Assistant Examiner* — Steven C Nguyen
(74) *Attorney, Agent, or Firm* — Greenblum & Bernstein, P.L.C.

(57) ABSTRACT

The present disclosure discloses a task management method based on an instant message, a client and a server. According to an example of the method, the client displays instant messages in a group on a message display interface. When a task conversion operation for any one of the instant messages is obtained on the message display interface, the client sends the task conversion operation for the instant (Continued)

message to the server. When receiving the task conversion operation, the server converts the instant message into a target task to be processed and sends the target task to the client. When receiving the target task from the server, the client displays the target task on a task display interface.

20 Claims, 7 Drawing Sheets

(56) References Cited

U.S. PATENT DOCUMENTS

| | | | |
|---|---|---|---|
| 2010/0004921 A1* | 1/2010 | Hufnagel | G06F 40/56 704/9 |
| 2011/0131584 A1 | 6/2011 | Wang et al. | |
| 2011/0219050 A1 | 9/2011 | Ly et al. | |
| 2012/0110087 A1 | 5/2012 | Culver et al. | |
| 2012/0158865 A1* | 6/2012 | Kurian | G06Q 10/06311 709/206 |
| 2012/0209749 A1 | 8/2012 | Hammad et al. | |
| 2013/0007749 A1 | 1/2013 | Chi et al. | |
| 2013/0265048 A1 | 10/2013 | Kalechofsky et al. | |
| 2015/0294259 A1* | 10/2015 | Collins | G06Q 10/063114 705/7.15 |
| 2015/0363092 A1 | 12/2015 | Morton | |
| 2016/0062968 A1* | 3/2016 | Umapathy | G06F 40/169 715/752 |
| 2017/0091717 A1* | 3/2017 | Chandraghatgi | H04L 67/36 |

FOREIGN PATENT DOCUMENTS

| | | |
|---|---|---|
| CN | 101540736 A | 9/2009 |
| CN | 102497442 A | 6/2012 |
| CN | 102611644 A | 7/2012 |
| CN | 102855532 A | 1/2013 |
| CN | 103646324 A | 3/2014 |
| CN | 104796327 A | 7/2015 |
| CN | 104899722 A | 9/2015 |
| CN | 105099877 A | 11/2015 |
| CN | 105791080 A | 7/2016 |
| CN | 106571999 A | 4/2017 |
| JP | 2003-067548 A | 3/2003 |
| JP | 2010-282415 A | 12/2010 |
| WO | 2018/072741 A1 | 4/2018 |

OTHER PUBLICATIONS

International Search Report issued in International Patent Application No. PCT/CN2017/106987, dated Nov. 29, 2017.
Office Action issued in Chinese Counterpart Patent Appl. No. 201610921306.X, dated Nov. 13, 2017, along with an English translation thereof.
English translation of Nov. 29, 2017 Written Opinion of the International Searching Authority Issued in Application No. PCT/CN2017/106987.
European Patent Office, Office Action Issued in Application No. 17861272.7, dated Apr. 9, 2020, Germany, 4 pages.
Japanese Patent Office, Office Action Issued in Application No. 2019-521786, dated May 12, 2020, 10 pages. (Submitted with Machine Translation).

* cited by examiner

Group ⌄

User A

Questions: why does WeChat prompt that the user logs in to the web version on the app? Have any students analyzed this?

*Message a1*

⟨- - Add to group-to-dos - -⟩ ①
⟨Convert into individual-to-dos⟩

┌─────────────────────────────────────┐
│ User A added "Have… analyzed this?" into to-dos. User D │ ②
│ acknowledged to-dos "Have… analyzed this?" │
└─────────────────────────────────────┘

User B

These questions of user A are arranged by user C @User C, think about them when you make a plan of 4.5. Question of contact is arranged and followed up by user F @User F

*Message b1*

User C

First, WeChat is a mobile end product, and the mobile end receives all the product status and can control the web end logout. Second, for information security, this way can keep track of the multiple logins of WeChat at any time.

*Message c1*

User D completed to-dos "book the meeting room for next week"

User A

The mobile end receives all the product status and can control the web end logout//Good idea

*Message a2*

User C

The problem of image clipping has been optimized in 4.3. The scheme of my convergence setting project has been worked out. Try to rank it in 4.5. The video conference room looks like a bug. Let me follow up.

*Message c2*

---

| Individual to-dos ⑧ | Group to-dos ⑦ |

Uncompleted

○ Questions: why does WeChat prompt that the user logs in to the web version   User D, User E,
   on the app? Have any students                                                   User F
   analyzed this?                                    ┌─ ─ ─ ─ ─ ─ ─┐
   From: User A  2016-8-10                           │    To be    │ ③
                                                     │ acknowledged │
                                                     └─ ─ ─ ─ ─ ─ ─┘

○ An optimization can be documented.
   If a bubble page is clicked on the left,
   can the bubble be switched up and
   down with the keyboard?
   From: User E  2016-8-11

○ When can the attendance version be    ┌─ ─ ─ ─ ─┐
   published? 4.4 is OK?                 │ User D  │ ④
   From: ┌─ ─ ─ ─┐ 2016-8-12             └─ ─ ─ ─ ─┘
         │ User D │
         └─ ─ ─ ─┘
              ⑤

Completed

┌─ ─ ─┐
│  ⦿  │ book the meeting room for              User D
└─ ─ ─┘ next week
   ⑥    From : User A  2016-8-10

FIG. 4

○ An optimization can be documented. If a bubble page is clicked on the left, can the bubble be switched up and down with the keyboard?

From: User E 2016-8-11

FIG.5A

○ An optimization can be documented. If a bubble page is clicked on the left, can the bubble be switched up and down with the keyboard?

From: User E 2016-8-11

| First user | (+)

○ An optimization can be documented. If a bubble page is clicked on the left, can the bubble be switched up and down with the keyboard?

From: User E 2016-8-11

| First user | | Second user | ... (+)

FIG.5B

○ An optimization can be documented. If a bubble page is clicked on the left, can the bubble be switched up and down with the keyboard?

From: User E 2016-8-11

TASK MANAGEMENT BASED ON INSTANT MESSAGE

CROSS REFERENCE TO RELATED APPLICATIONS

This application claims priority to Chinese Patent Application No. 201610921306.X filed on Oct. 21, 2016, the entire content of which is incorporated herein by reference.

TECHNICAL FIELD

The present disclosure relates to task management based on an instant message.

BACKGROUND

An instant messaging application plays an important role in people's daily lives, and people can conveniently communicate with each other based on the instant messaging application. With the instant messaging application, people can chat one to one or chat in a group with several persons.

Converting a chat content into an office task based on the instant messaging application and managing the office task are a new office application scenario. In such office application scenario, there are a plurality of chat messages in the instant messaging software, and some messages may be easily overlooked, thereby causing that some office tasks cannot be executed. In addition, when distributing tasks in such a scenario, a task distributor is also required to know who a task executor is. However, the task distributor usually does not know a specific task situation, and thus does not know who the task executor is. In this way, the task may not be effectively executed. Based on this, how to efficiently manage a task based on the instant messaging application becomes a problem to be urgently solved.

SUMMARY

To solve the above technical problems, examples of the present disclosure provide a task management method based on an instant message, a client and a server.

The task management method based on an instant message provided by an example of the present disclosure includes that: a client displays instant messages in a group on a message display interface; when a task conversion operation for a target message is obtained on the message display interface, the client sends the task conversion operation for the target message to a server, where the target message is any one of the instant messages displayed on the message display interface; the client receives a target task to be processed and converted based on the target message from the server; and the client displays the target task on a task display interface.

The client provided by an example of the present disclosure includes: a displaying unit, configured to display instant messages in a group on a message display interface; an inputting unit, configured to obtain a task conversion operation for a target message on the message display interface, where the target message is any one of the instant messages displayed on the message display interface; and a communicating unit, configured to send the task conversion operation for the target message to the server and receive a target task to be processed and converted based on the target message from the server. Where the displaying unit is further configured to display the target task on a task display interface.

An electrical device provided by an example of the present disclosure includes a memory, a processor and computer instructions stored on the memory and executable by the processor. The instructions are executed by the processor to implement the above task management method based on an instant message for the client.

A computer storage medium storing computer instructions is provided by an example of the present disclosure. The computer instructions are executed by the processor to implement the above task management method based on an instant message for the client.

The task management method based on an instant message provided by another example of the present disclosure includes that: a server sends instant messages in a group to a client; when receiving a task conversion operation for a target message sent by the client, the server converts the target message into a target task to be processed, where the target message is any one of the instant messages in the group; and the server sends the target task to be processed to the client.

A server provided by an example of the present disclosure includes: a communicating unit, configured to send instant messages in a group to a client and receive a task conversion operation for a target message sent by the client, wherein the target message is any one of the instant messages in the group; and a processing unit, configured to convert the target message into a target task to be processed. Where the communicating unit is further configured to send the target task to the client.

An electrical device provided by another example of the present disclosure includes: a memory, a processor and computer instructions stored on the memory and executable by the processor. Where the instructions are executed by the processor to implement the above task management method based on an instant message for the server.

A computer storage medium storing computer instructions is provided by another example of the present disclosure. Where the instructions are executed by the processor to implement the above task management method based on an instant message for the server.

In the technical solutions of examples of the present disclosure, instant messages are displayed in a group on a message display interface; when a task conversion operation for a target message is obtained on the message display interface, the task conversion operation for the target message is sent to a server; a target task to be processed and converted based on the target message is received from the server; and the target task is displayed on a task display interface. By using the technical solutions of examples of the present disclosure, the user can select an effective instant message from a plurality of instant messages and convert the instant message into a task to be processed. Furthermore, the task distributor only needs to present a task (e.g., perform an operation of converting the instant message into the task to be processed) without knowing who the task executor is. Distribution management is performed on the tasks with an instant messaging technology, and thus a collaboration efficiency among instant messaging participants is effectively improved.

DETAILED DESCRIPTION OF THE EMBODIMENTS

To understand features and technical contents of examples of the present disclosure in more detail, implementations of the examples of the present disclosure will be described below in detail in combination with accompanying drawings. The accompanying drawings are only used for reference and explanation rather than limiting the examples of the present disclosure.

Figure 1:
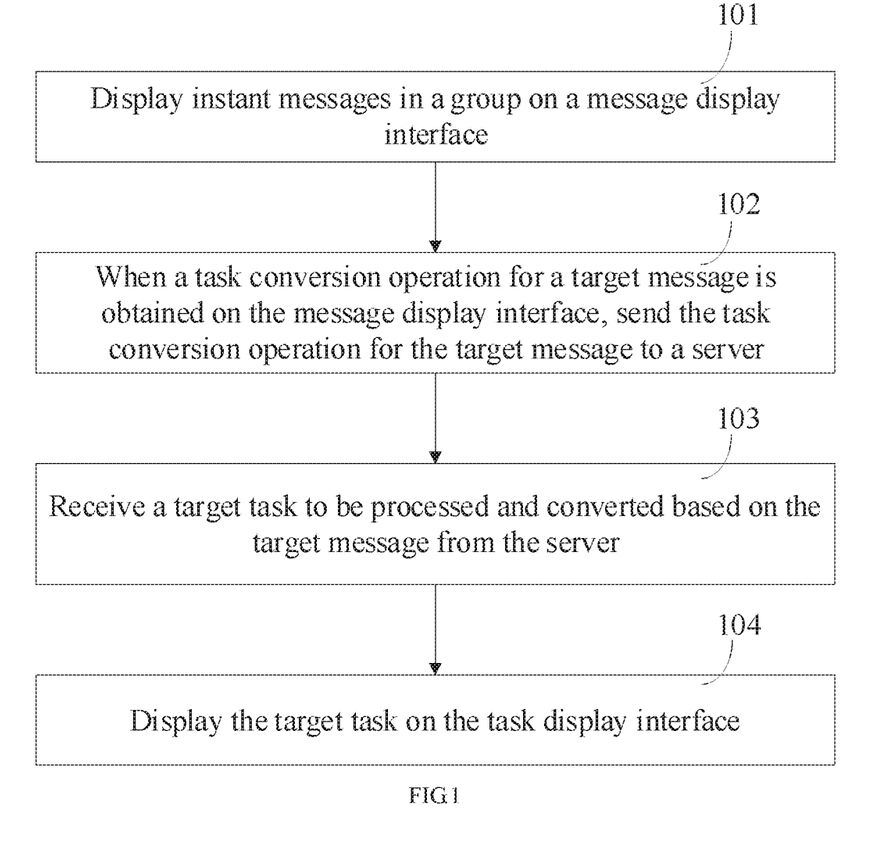
FIG. 1 is a flowchart illustrating a task management method based on an instant message according to an example of the present disclosure.

FIG. 1 is a flowchart illustrating a task management method based on an instant message according to an example of the present disclosure. The task management method based on an instant message in this example may be applied to a client. As shown in FIG. 1, for the client, the task management method based on an instant message may include the following blocks 101-104.

At block 101, instant messages in a group are displayed on a message display interface.

In examples of the present disclosure, the client refers to a communication terminal, such as a smart phone, a personal computer, a tablet computer and so on, which is installed with an instant messaging application. A user may apply for an account through the instant messaging application, and log into the instant messaging application with the account to experience different functions, such as a chat function, a video function, a file transmission function and so on, provided by the instant messaging application. Generally, one user corresponds to one account. Therefore, the account may be used to represent the user. A plurality of users may be added into one group by the instant messaging application, thereby creating a group chat. In the group chat, all users may publish instant messages and see instant messages published by other users. One-to-one instant messaging, that is, instant messaging between two users, may also be performed by the instant messaging application.

At block 102, when a task conversion operation for a target message is obtained on the message display interface, the task conversion operation for the target message is sent to a server.

At block 103, a target task to be processed and converted based on the target message is received from the server.

In examples of the present disclosure, one instant message in a particular group chat or a particular one-to-one chat may be converted into a task to be processed. Specifically, when obtaining a task conversion operation for a target message on the message display interface, the client may send the task conversion operation for the target message to the server. In this way, the target message may be converted into a to-be-processed target task by the server. Then, the client receives the to-be-processed target task converted based on the target message from the server.

Figure 3:
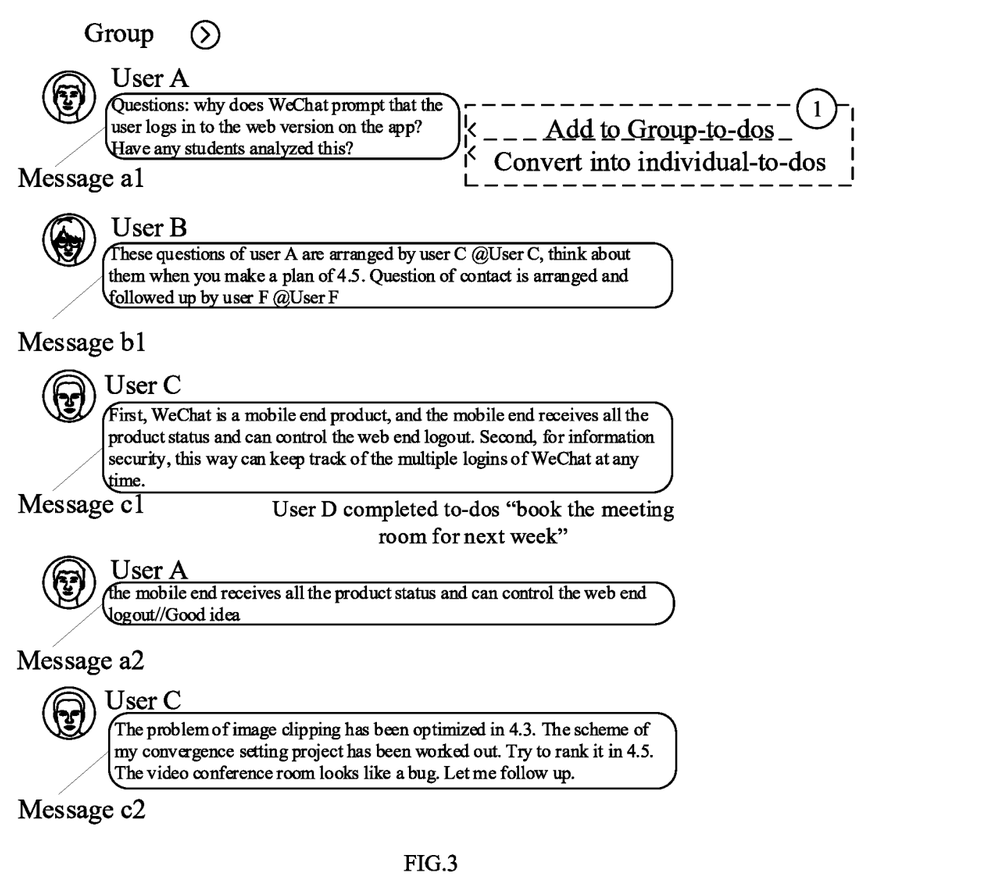
FIG. 3 is a schematic diagram illustrating a display interface of an instant message according to an example of the present disclosure.

FIG. 3 illustrates a message display interface of an instant messaging application. Contents of a group chat or contents of a one-to-one chat can be displayed on the message display interface. Explanation will be made to FIG. 3 with the group chat as an example. In the current group chat, a user A, a user B and a user C all publish instant messages. For example, the user A publishes a message a1 and a message a2, the user B publishes a message b1, and the user C publishes a message c1 and a message c2. If a user D (not shown in FIG. 3) wants to add the message a1 published by the user A into group-to-dos, the user D triggers a task conversion operation for the message a1 at this time. For example, the user D may select the message a1, and then pop up an option box near the message a1 (as shown in a dashed box 1 in FIG. 3). The option box includes two options, one option of which is "add to group-to-dos" and the other option is "convert into individual-to-dos". When the user D selects the option of "add to group-to-dos" (a task conversion operation associated with the option of "add to group-to-dos" may be hereinafter referred to as a "first task conversion operation"), the user D may only serve as a task distributor of the task. In addition, when the user D selects the option of "convert into individual-to-dos" (a task conversion operation associated with the option of "convert into individual-to-dos" may be hereinafter referred to as a "second task conversion operation"), the user D may serve as both a distributor and an executor (also referred to as a task acknowledging user) of the task. The user D is a user who logs in the local instant messaging application, may be any one of the user A, the user B and the user C, or may also be a user other than the user A, the user B and the user C.

In the above solution, the distributor of the task is not limited to the user D. In fact, one skilled in the art should understand that any user in a chat may perform a task conversion operation for any instant message in the chat, and may become a distributor of a converted target task. Further, in examples of the present disclosure, an instant message to be converted into a task is referred to as a target message, and a converted task is referred to as a target task.

At block 104, the target task is displayed on the task display interface.

In examples of the present disclosure, the task display interface may refer to a group-to-dos display interface. In addition, the client may further include an individual-to-dos display interface. The group-to-dos display interface may display all task messages of a group chat or a one-to-one chat. The individual-to-dos display interface may display all task messages acknowledged by a user logging in the local instant messaging application. The user may switch the group-to-dos display interface into the individual-to-dos display interface or switch the individual-to-dos display interface into the group-to-dos display interface.

Further, an example of the present disclosure may further include another implementation, that is, after a message distributor edited an instant message, before the instant message is published on a message display interface, the message distributor may directly convert the instant message into a task and distribute the task to the group-to-dos through a particular control (or through another manner, which is not limited herein). In this case, the message publisher also is a task distributor at the same time. Therefore, it is convenient for a user to publish a message and distribute a task simultaneously through one operation.

In the example, the obtained task conversion operation for the target message is an operation by which the message distributor converts an instant message into a task and distributes the task to a group-to-dos through a particular control.

Figure 4:
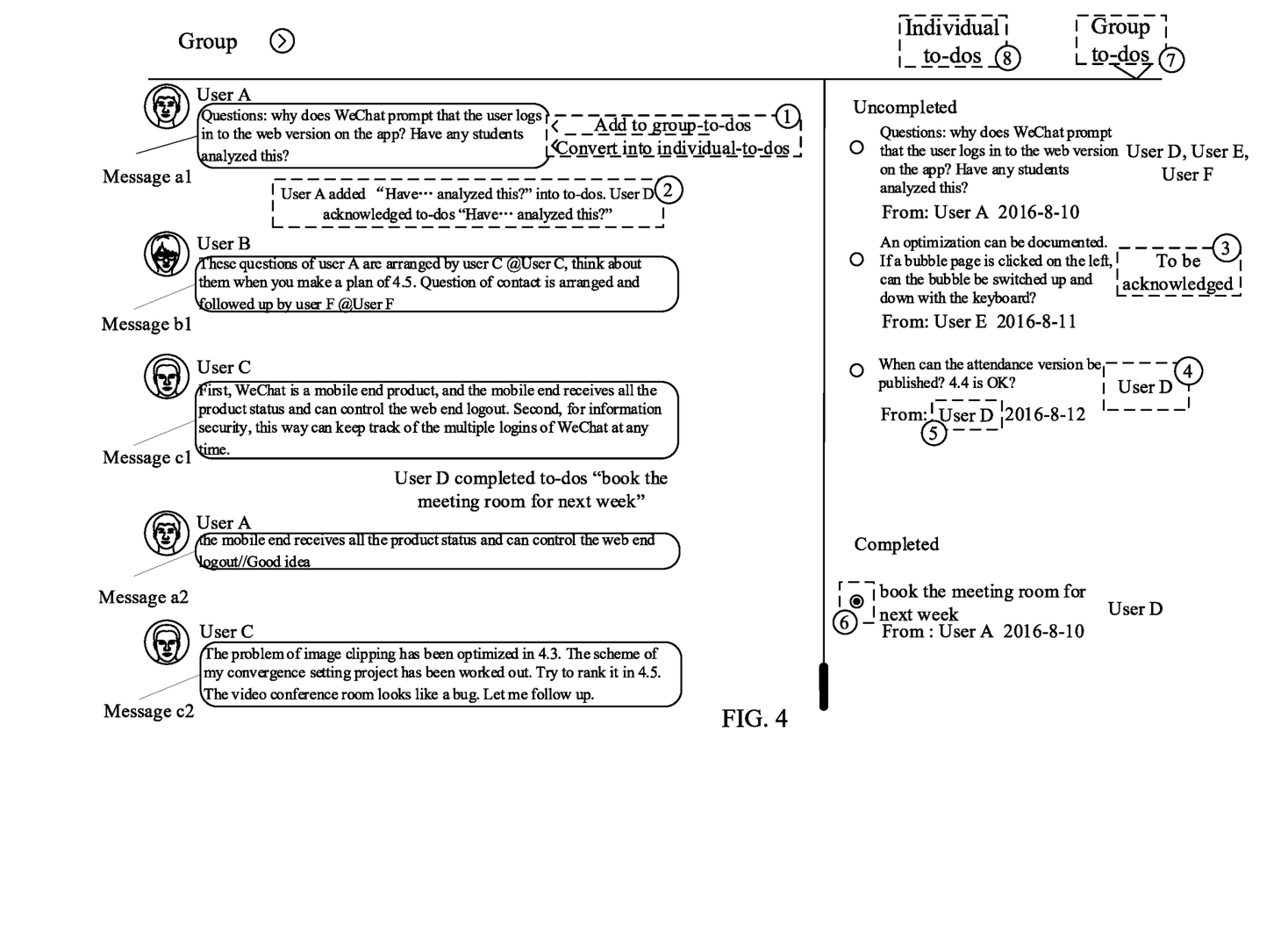
FIG. 4 is a schematic diagram illustrating a display interface of an instant message according to another example of the present disclosure.

In an example, the task display interface and the message display interface may be located in different display regions of a same page. As shown in FIG. 4, the left side is the message display interface, and the right side is the task display interface. The upper half region of the task display interface displays different target tasks and the lower half region of the task display interface displays a processing result of the target task. Certainly, a display layout of the task display interface may also not be limited to the arrangement manner shown in FIG. 4 and the positions of different regions may be arranged flexibly according to user requirements.

In another example, the task display interface and the message display interface may be located in different pages. For example, the task display interface and the message display interface may be displayed on a separate page respectively.

In examples of the present disclosure, when the target task is displayed on the task display interface, displayed information may at least include a task content and task distribution information.

As shown in FIG. 4, when the task display interface is displayed at the right side, a word "group-to-dos" (as shown in a dashed box 7 in FIG. 4) is correspondingly selected on the top of the task display interface so that the user can clearly know that what are currently displayed are all group-to-dos. Also, the user may select a word "individual-to-dos" (as shown in a dashed box 8 in FIG. 4) on the top of the task display interface. In this case, the task display interface at the right side will display all individual-to-dos. The individual-to-dos herein refers to individual-to-dos based on the present group, and may include target tasks acknowledged by a user who is in the present group and logs into the instant messaging application.

In examples of the present disclosure, when the task conversion operation is the first task conversion operation, the task distribution information indicates that the target task is in an unacknowledged state. When the task conversion operation is the second task conversion operation, the task distribution information includes an identifier of a user performing the task conversion operation.

In an example, the user may directly convert the target message into an individual-to-dos by selecting "convert into individual-to-dos" (as shown in the dashed box 1 in FIG. 4). At this time, the user serves as both a task distributor and a task acknowledging user. In this case, the displayed information of the target task may include a task content and an identifier of the local user. As shown in a dashed box 4 of FIG. 4, the user identifier is a name of the user D.

In another example, the user may add the target message into a group-to-dos by selecting "add to group-to-dos" (as shown in the dashed box 1 in FIG. 4). At this time, the user only serves as a task distributor. In this case, the displayed information of the target task may include a task content and to-be-acknowledged (as shown in a dashed box 3 of FIG. 4).

In examples of the present disclosure, any user may perform the first task conversion operation of converting an instant message into a target task, and await other users to acknowledge the convened target task.

In examples of the present disclosure, when a task acknowledging operation for the target task is obtained, the identifier of the user acknowledging the task is added to the task distribution information of the target task.

A same target task may be acknowledged by a plurality of users. As shown in FIG. 4, when the user D, a user E and a user F all acknowledge the task associated with the message a1, the user identifiers of the user D, the user E and the user F are displayed respectively at the right side of the task associated with the message a1.

Acknowledgements of a plurality of users may be divided into two classes: the first class is an acknowledgement made by a first user associated with a local client; and the second class is acknowledgements made by second users associated with non-local clients. Based on this, when the task acknowledging operation performed by the first user for the target task is obtained, the identifier of the first user is added to the task distribution information of the target task; when the task acknowledging operation performed by at least one second user for the target task is obtained from the server, the identifier of the at least one second user is added to the task distribution information of the target task.

Figure 5A:
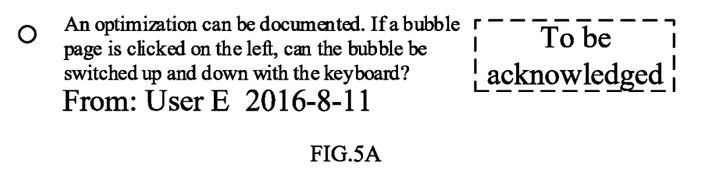
FIGS. 5A, 5B and 5C are schematic diagrams illustrating a display interface of an instant message according to still another example of the present disclosure.
Figure 5B:
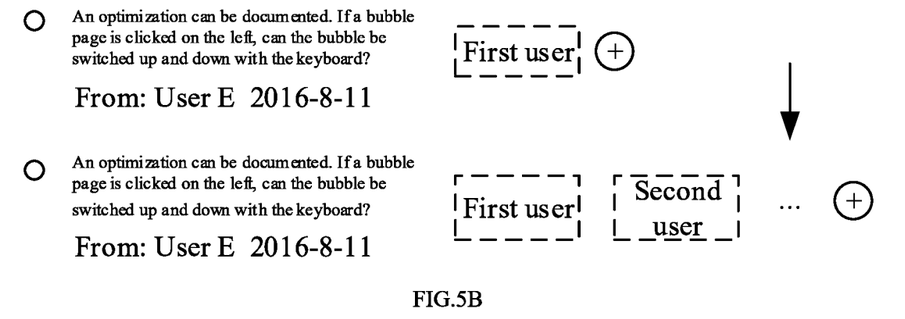

In an example, when the target task is in the unacknowledged state, the task distribution information of the target task is displayed as "to be acknowledged", as shown in FIG. 5A. As shown in FIG. 5B, after the first user acknowledges the target task, the identifier of the first user and a control "+" may appear in the task distribution information of the target task to allow another second user to acknowledge the target task.

Figure 5C:
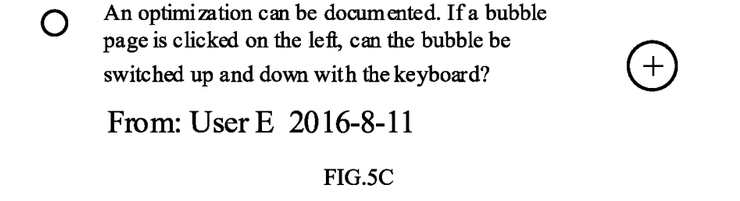

In another example, when the target task is in the unacknowledged state, the task distribution information of the target task may directly display the control "+" as shown in FIG. 5C. In addition, even if the first user acknowledges the target task, the control "+" may still exist as shown in FIG. 5B, so that another second user may be allowed to acknowledge the target task.

In examples of the present disclosure, when a task processing operation for the target task is obtained, a processing result of the target task may be displayed on the task display interface.

As shown in FIG. 4, when a user acknowledging the target task processes and completes the target task, the user may select the target task at an "uncompleted" region of the task display interface of the group-to-dos, such that the target task is displayed at a "completed" region of the task display interface of the group-to-dos. Certainly, the target task may also be selected at an "uncompleted" region of the task display interface of the individual-to-dos, such that the target task is displayed at a "completed" region of the task display interface of the individual-to-dos. In addition, the contents of the individual-to-dos and the contents of the group-to-dos may be updated synchronously.

In examples of the present disclosure, only the acknowledging user can trigger the task processing operation, and the acknowledging user can only trigger the task processing operation for the target task acknowledged by himself.

In examples of the present disclosure, the user can select an effective instant message from a plurality of instant messages, and convert the instant message into a task to be processed. The task distributor only needs to present a task (i.e., perform an operation of converting the instant message into the task to be processed) without knowing who the task executor is. Further, distribution management is performed on the tasks based on an instant messaging technology, thereby effectively improving a collaboration efficiency among instant messaging participants.

Figure 2:
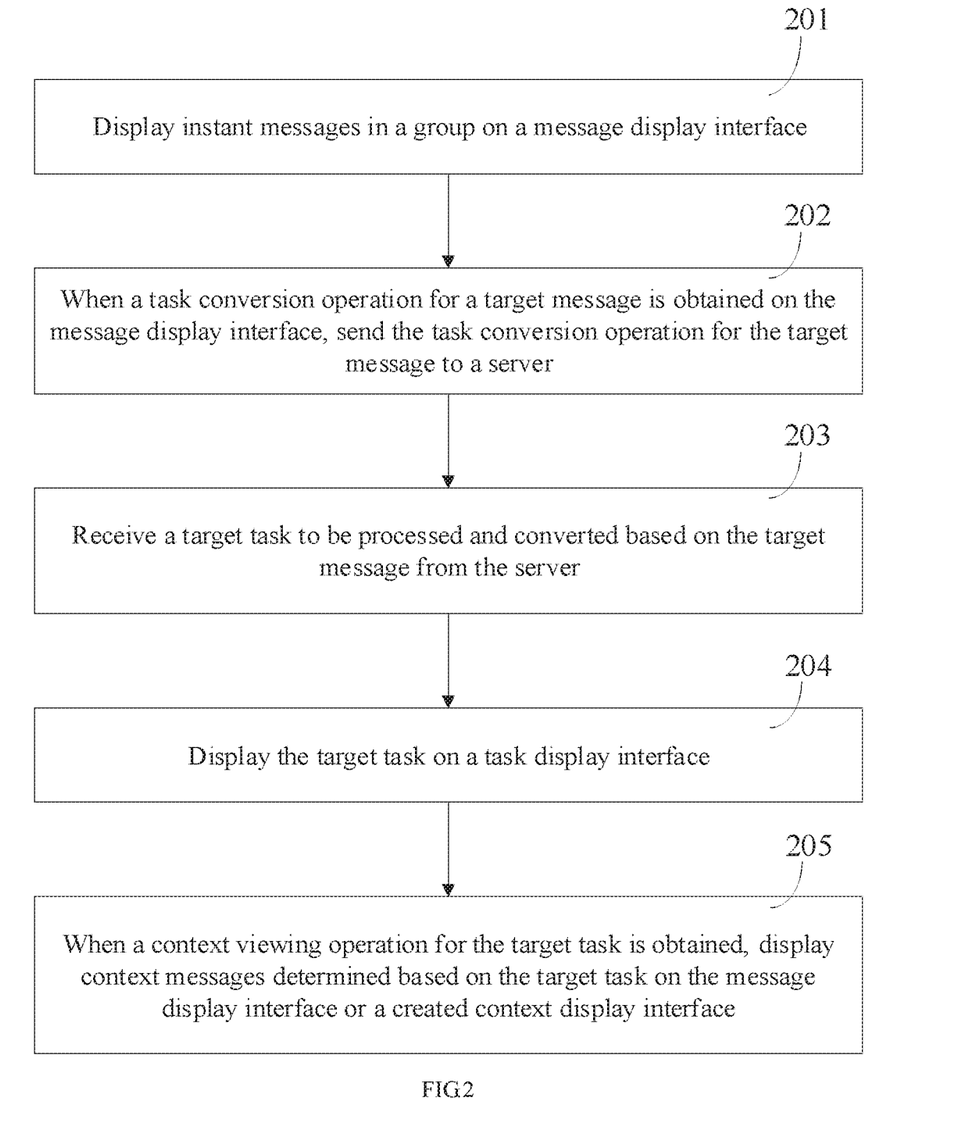
FIG. 2 is a flowchart illustrating a task management method based on an instant message according to another example of the present disclosure.

FIG. 2 is a flowchart illustrating a task management method based on an instant message according to another example of the present disclosure. The task management method based on an instant message in this example may be applied to a client. As shown in FIG. 2, for the client, the task management method based on an instant message may include the following blocks 201-205.

At block 201, instant messages in a group are displayed on a message display interface.

At block 202, when a task conversion operation for a target message is obtained on the message display interface, the task conversion operation for the target message is sent to a server.

At block 203, a target task to be processed and converted based on the target message is received from the server.

At block 204, the target task is displayed on a task display interface.

The blocks 201-204 are similar to the blocks 101-104 respectively, and specific descriptions thereof may be referred to the above descriptions, which will not be described herein.

At block 205, when a context viewing operation for the target task is obtained, context messages determined based on the target task are displayed on the message display interface or on a newly-created context display interface.

As shown in FIG. 4, when a user clicks a position as shown in a dashed box 5 in FIG. 4 for a particular target task, context messages of the instant message associated with the target task may be displayed on the message display interface, thereby tracing back to a chat scenario of that time when the target task was discussed, so as to facilitate understanding the task distribution scenario by the user. Certainly, a new display interface (also referred to as a "context display interface" in the present disclosure) may also be created to display the context messages of that time when the target task is discussed.

When a task conversion operation for the target message is obtained, a prompt associated with the task conversion operation may be displayed on the message display interface to prompt that the user performs the task conversion operation on the target message.

When a task acknowledging operation for the target message is obtained, a prompt associated with the task acknowledging operation may be displayed on the message display interface to prompt that the user acknowledges the target task.

When a task processing operation for the target message is obtained, a prompt associated with the task processing operation may be displayed on the message display interface to prompt that the user processes the target task.

As shown in a dashed box 2 of FIG. 4, when the task conversion operation for the target message is obtained, or the task acknowledging operation of the second user for the target task is obtained, or the task processing operation of the second user for the target task is obtained, prompts may be displayed on the message display interface to prompt the user with related operation contents, for example, which instant messages are added to the group-to-dos, which users acknowledge which tasks, and which tasks are completed.

In examples of the present disclosure, when two users in a group perform one-to-one instant messaging, a task associated with both users may be displayed on the task display interface during the one-to-one chat. The task associated with both users participating in the one-to-one chat may refer to that: the task conversion operation associated with the task is triggered by one of the two users, and the task acknowledging operation is triggered by the other user. In this case, when performing the one-to-one chat, the task acknowledging user and the task distributor can clearly see relevant tasks between two users. For example, the user A distributes a task d in a group, and the user B acknowledges the task d in the group. When the user A and the user B perform a one-to-one chat, information associated with the task d may be automatically displayed in the chat between the user A and the user B.

In examples of the present disclosure, the user can select an effective instant message from a plurality of instant messages, and convert the instant message into a task to be processed. The task distributor only needs to present a task (e.g., perform an operation of converting the instant message into the task to be processed) without knowing who the task executor is. In addition, the task can be automatically distributed in a task acknowledging manner, and the displayed information of the task includes task distribution information, thereby facilitating that the task distributor knows about a distribution situation and a completion situation of the task. Distribution management is performed on the tasks based on the instant messaging technology, thereby effectively improving the collaboration efficiency among instant messaging participants. Further, the context messages of that time when the task was discussed may be re-displayed to trace back to the chat scenario of that time, thereby facilitating that the user knows about the scenario of task distribution.

Figure 6:
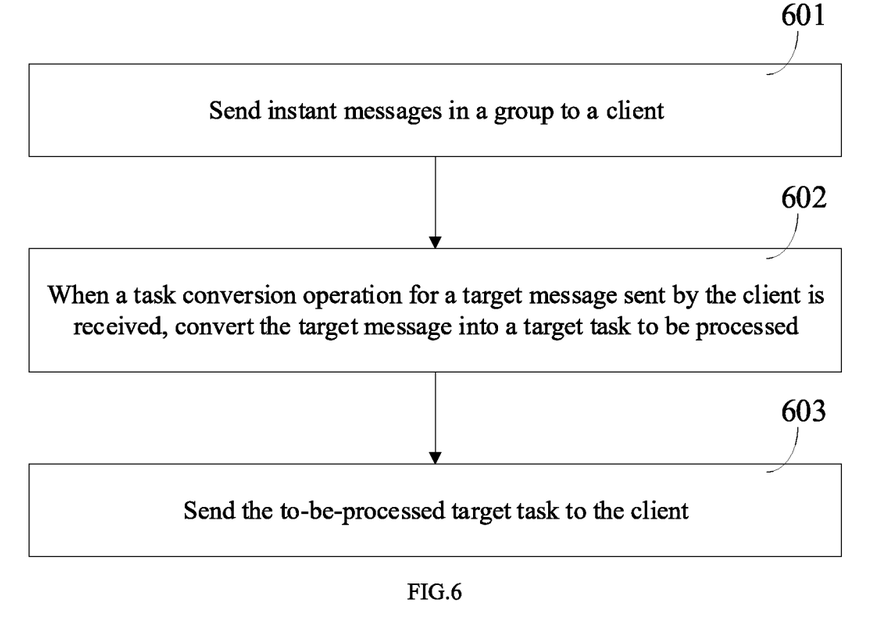
FIG. 6 is a flowchart illustrating a task management method based on an instant message according to another example of the present disclosure.

FIG. 6 is a flowchart illustrating a task management method based on an instant message according to still another example of the present disclosure. The task management method based on an instant message in this example may be applied to a server. Further, the task management method based on an instant message for the server may be understood by referring to the above task management method based on an instant message for the client. As shown in FIG. 6, for the server, the task management method based on an instant message may include the following blocks 601-603.

At block 601, instant messages in a group are sent to a client.

In examples of the present disclosure, when users in a group create a group chat or a one-to-one chat with the respective clients of the users, the server may receive instant messages sent by the users in the group through the respective clients of the users and send the instant messages in the group to each of the clients. In this case, the instant messages published by each of the users in the group may be displayed in each of the clients.

At block 602, when a task conversion operation for a target message sent by the client is received, the target message is converted into a target task to be processed.

In examples of the present disclosure, when obtaining a task conversion operation for a target message, a client may send the task conversion operation for the target message to the server. At this time, the server may convert the target message into a target task to be processed.

In examples of the present disclosure, the target task may at least include a task content and task distribution information. The task content is used to describe details of the target task. The task distribution information is used to indicate who acknowledges the target task. For example, when the task conversion operation is the first task conversion operation, the task distribution information may indicate that the target task is in an unacknowledged state. When the task conversion operation is the second task conversion operation, the task distribution information may include an identifier of a user performing the task conversion operation.

In examples of the present disclosure, when the target task is in the unacknowledged state, the task management method based on an instant message for the server may further include: when a task acknowledging operation for the target task sent by the client is received, the identifier of the user acknowledging the task is added into the task distribution information; and when a task processing operation for the target task sent by the client is received, a processing result of the target task is sent to the client.

At block 603, the target task to be processed is sent to the client.

In examples of the present disclosure, after converting the target message into the target task to be processed, the server sends the to-be-processed target task to the client, so that the client may display the target task on the task display interface.

In examples of the present disclosure, when receiving a context viewing operation for the target task sent by the client, the server may query context messages of the instant message associated with the target task and send the obtained context messages of the instant message associated with the target task to the client.

One skilled in the art should understand that the task management method based on an instant message for the server shown in FIG. 6 may be understood by referring to the relevant descriptions of the above task management methods based on an instant message for a client shown in FIG. 1 and FIG. 2. In examples of the present disclosure, the user can select an efficient instant message from a plurality of instant messages, and convert the instant message into a task to be processed. The task distributor only needs to present a task (e.g., perform an operation of converting the instant message into the task to be processed) without knowing who the task executor is. Further, the task can be automatically distributed in a task acknowledging manner, and the displayed information of the task includes task distribution information, thereby facilitating knowing about a distribution situation and a completion situation of the task by the task distributor. Distribution management is performed on the tasks based on the instant messaging technology, thereby efficiently improving the collaboration efficiency among instant messaging participants. Further, the context messages of that time when the task was discussed may be re-displayed to trace back to the chat scenario of that time, thereby facilitating that the user knows about the scenario of task distribution.

Figure 7:
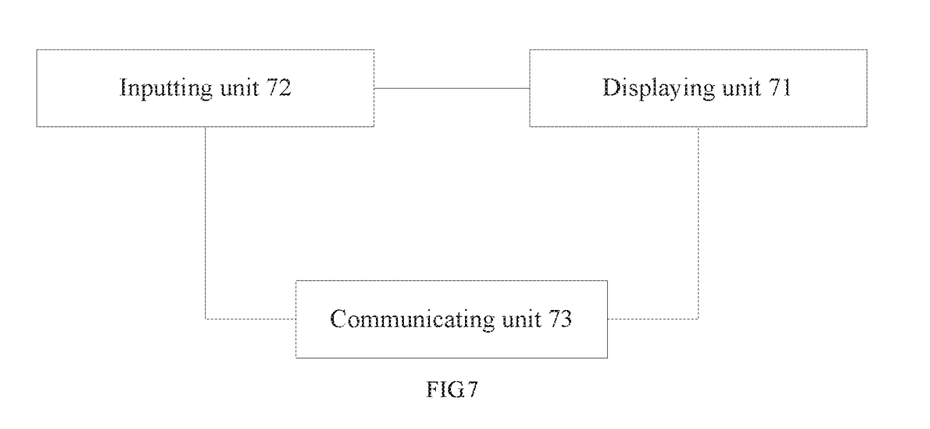
FIG. 7 is a schematic diagram illustrating a structure of a client according to an example of the present disclosure.

FIG. 7 is a schematic diagram illustrating a structure of a client according to an example of the present disclosure. As shown in FIG. 7, the client 700 may include a displaying unit 71, an inputting unit 72 and a communicating unit 73. The displaying unit 71 may be configured to display instant messages in a group on a message display interface. The inputting unit 72 may be configured to obtain a task conversion operation for a target message on the message display interface. The communicating unit 73 may be configured to send the task conversion operation for the target message to a server.

Further, the communicating unit 73 may further be configured to receive a to-be-processed target task that is converted based on the target message from the server. In this case, the displaying unit 71 may further be configured to display the target task on a task display interface.

In examples of the present disclosure, the target task may at least include a task content and task distribution information. When the task conversion operation is the first task conversion operation, the task distribution information indicates that the target task is in an unacknowledged state. When the task conversion operation is the second task conversion operation, the task distribution information includes an identifier of a user performing the task conversion operation.

In examples of the present disclosure, when the target task is in the unacknowledged state, the inputting unit 72 may further be configured to obtain a task acknowledging operation for the target task. In this case, the displaying unit 71 may further be configured to add an identifier of a user acknowledging the task into the task distribution information.

In examples of the present disclosure, when the task acknowledging operation performed by a first user associated with a local client for the target task is obtained, the inputting unit 72 is further configured to add the identifier of the first user into the task distribution information, when the task acknowledging operation performed by at least one second user for the target task is obtained from the server, the identifier of the at least one second user is added to the task distribution information of the target task. When the communicating unit 73 obtains the task acknowledging operation performed by at least one second user for the target task from the server, the inputting unit 72 is further configured to add the identifier associated with the at least one second user respectively into the task distribution information.

In examples of the present disclosure, the inputting unit 72 may further be configured to obtain a task processing operation for the target task. In this case, the displaying unit 71 may further be configured to display a processing result of the target task on the task display interface.

In examples of the present disclosure, the task display interface and the message display interface may be located in different display regions of a same page.

In examples of the present disclosure, the inputting unit 72 may further be configured to obtain a context viewing operation for the target task. In this case, the displaying unit 71 may further be configured to display context messages determined based on the target task on the message display interface or on a newly-created context display interface, which includes context of the instant message associated with the target task.

In examples of the present disclosure, the displaying unit 71 may further be configured to display a prompt associated with the task conversion operation on the message display interface to prompt that a user performs task conversion on the target message, display a prompt associated with the task acknowledging operation on the message display interface to prompt that a user acknowledges the target task, and a prompt associated with the task processing operation on the message display interface to prompt that a user processes the target task.

One skilled in the art should understand that implementation functions of different units in the client shown in FIG. 7 may be understood by referring to the relevant descriptions of the above task management methods based on an instant message for the client. The functions of different units in the client shown in FIG. 7 may be implemented by programs run on a processor, and may also be implemented by a specific logical circuit.

Figure 8:
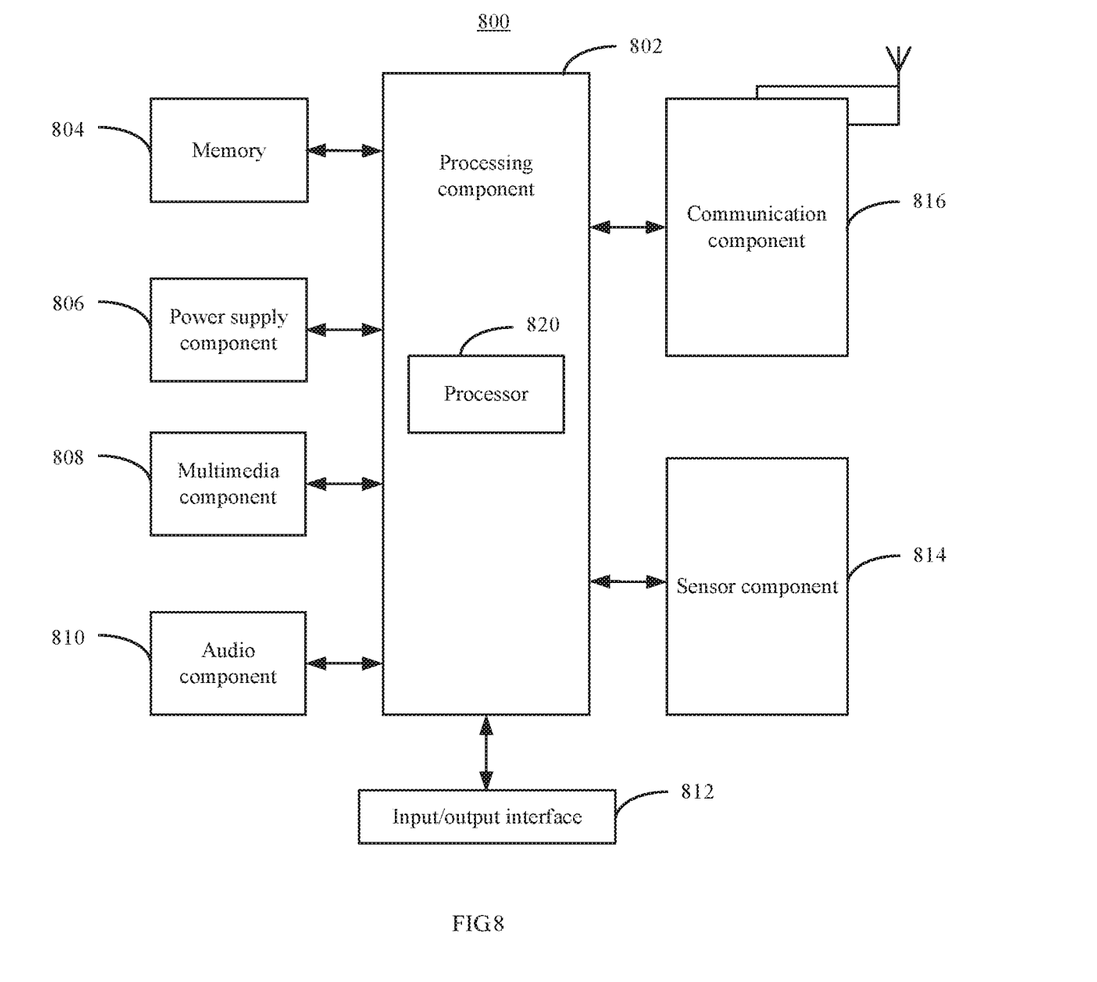
FIG. 8 is a schematic diagram illustrating a hardware structure of a client according to another example of the present disclosure.

Examples of the present disclosure further provides a client, such as a mobile phone, a computer, a digital broadcast terminal, a message transceiver, a game console, a tablet device, a personal digital assistant and so on. As shown in FIG. 8, the client 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the client 800, such as operations associated with display, phone calls, data communications, camera operations, and recording operations. The processing component 802 may include one or more processors 820 to execute instructions to complete all or part of the blocks of the above task management methods based on an instant message for the client. For example, when executing the instructions, the processor 820 is caused to implement the blocks of the methods as shown in FIG. 1 or FIG. 2, which includes: displaying instant messages in a group on a message display interface; when a task conversion operation for a target message is obtained on the message display interface, sending the task conversion operation for the target message to a server; receiving a target task to be processed and converted based on the target message from the server; and displaying the target task on a task display interface. It is noted that all blocks of the methods shown in FIG. 1 and FIG. 2 may be executed.

In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store different types of data to support operations of the client 800. Examples of such data include instructions for any application or method operated on the client 800, contact data, phonebook data, messages, pictures, videos, and so on. The memory 804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 806 supplies power for different components of the client 800. The power supply component 806 may include a power supply management system, one or more power supplies, and other components associated with generating, managing and distributing power for the client 800.

The multimedia component 808 includes a screen providing an output interface between the client 800 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 808 may include a front camera and/or a rear camera. The front camera and/or rear camera may receive external multimedia data when the client 800 is in an operating mode, such as a photographing mode or a video mode. Each of the front camera and the rear camera may be a fixed optical lens system or have focal length and optical zooming capability.

The audio component 810 is configured to output and/or input an audio signal. For example, the audio component 810 includes a microphone (MIC). When the client 800 is in an operation mode, such as a call mode, a record mode and a voice recognition mode, the microphone is configured to receive an external audio signal. The received audio signal may be further stored in the memory 804 or sent via the communication component 816. In some examples, the audio component 810 also includes a speaker for outputting an audio signal.

The I/O interface 812 provides an interface between the processing component 802 and a peripheral interface module. The above peripheral interface module may be a keyboard, a click wheel, a button, or the like. These buttons may include but not limited to, a home button, a volume button, a start button and a lock button.

The sensor component 814 includes one or more sensors for providing a state assessment in different aspects for the client 800. For example, the sensor component 814 may detect an on/off state of the client 800 and a relative location of components. For example, the components are a display and a keypad of the client 800. The sensor component 814 may also detect a position change of the client 800 or a component of the client 800, presence or absence of a touch between a user and the client 800, an orientation or acceleration/deceleration of the client 800, and a temperature change of the client 800. The sensor component 814 may include a proximity sensor for detecting the existence of a nearby object without any physical touch. The sensor component 814 may also include a Complementary Metal-Oxide-Semiconductor (CMOS) or Charged Coupled Device (CCD) image sensor applied in an imaging application. In some examples, the sensor component 814 may also include an acceleration sensor, a gyro sensor, a magnetic sensor, a pressure sensor, or a temperature sensor.

The communication component 816 is configured to facilitate wired or wireless communication between the client 800 and other devices. The client 800 may access a wireless network based on a communication standard, such as WiFi, 2G or 3G, or a combination thereof. In examples, the communication component 816 receives a broadcast signal or broadcast related information from an external broadcast management system via a broadcast channel. In examples, the communication component 816 may also include a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In examples, the client 800 may be implemented by one or more of application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the above methods as shown in FIG. 1 and FIG. 2.

An example of the present disclosure also provides a computer storage medium, for example, a memory 804. The computer storage medium stores computer instructions, and the instructions may be executed by a processor 820 to complete the blocks of the methods as shown in FIG. 1 or FIG. 2, which includes: displaying instant messages in a group on a message display interface, when a task conversion operation for a target message is obtained on the message display interface, sending the task conversion operation for the target message to a server; receiving a target task to be processed and converted based on the target message from the server, and displaying the target task on a task display interface. It is noted that all blocks of the methods shown in FIG. 1 and FIG. 2 may be executed.

Figure 9:
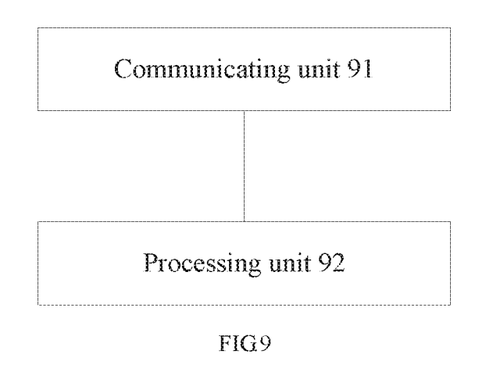
FIG. 9 is a schematic diagram illustrating a structure of a server according to an example of the present disclosure.

FIG. 9 is a schematic diagram illustrating a structure of a server according to an example of the present disclosure. As shown in FIG. 9, the server may include a communicating unit 91 and a processing unit 92. The communicating unit 91 may be configured to send instant messages in a group to a client and receive a task conversion operation for a target message sent by the client. The processing unit 92 may be configured to convert the target message into a to-be-processed target task. In addition, the communicating unit 91 may further be configured to send the to-be-processed target task to the client.

In examples of the present disclosure, the target task may at least include a task content and task distribution information. When the task conversion operation is a first task conversion operation, the task distribution information may indicate that the target task is in an unacknowledged state. When the task conversion operation is a second task conversion operation, the task distribution information may include an identifier of a user performing the task conversion operation.

In examples of the present disclosure, when the target task is in the unacknowledged state, the communicating unit 91 may also be configured to receive a task acknowledging operation for the target task sent by the client. In this case, the processing unit 92 may also configured to add the identifier of the user performing the task acknowledging operation into the task distribution information.

In examples of the present disclosure, the communicating unit 91 may also be configured to receive a task processing operation for the target task sent by the client. In this case, the communicating unit 91 may also be configured to send a processing result of the target task sent to the client.

In examples of the present disclosure, the communicating unit 91 may also be configured to receive a context viewing operation for the target task sent by the client. In this case, the processing unit 92 may also be configured to query context messages of the instant message associated with the target task. The communicating unit 91 may also be configured to send the context messages of the instant message associated with the target task to the client.

One skilled in the art should understand that implementation functions of different units in the server shown in FIG. 9 may be understood by referring to the relevant descriptions of the above task management method based on an instant message for the server. The functions of different units of the server shown in FIG. 9 may be implemented by programs run on a processor, and may also be implemented by a specific logical circuit.

Figure 10:
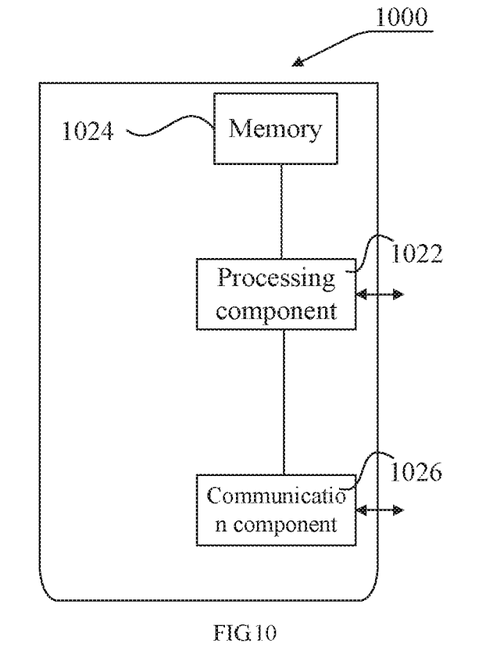
FIG. 10 is a schematic diagram illustrating a hardware structure of a server according to another example of the present disclosure.

An example of the present disclosure also provides a server. As shown in FIG. 10, the server 1000 includes a processing component 1022, a memory 1024, a communication component 1026, and a signal processing component of the server. The processing component 1022 may further include one or more processors. When executing instructions stored in the memory 1024, one processor in the processing component 1022 may be configured to implement the blocks of the method as shown in FIG. 6, which includes: sending instant messages in a group to a client; when a task conversion operation for a target message sent by the client is received, converting the target message into a to-be-processed target task; and sending the to-be-processed target task to the client. It is noted that all blocks of the method shown in FIG. 6 may be executed.

An example of the present disclosure also provides a computer storage medium, for example, a memory 1024. The computer storage medium stores computer instructions, and the instructions may be executed by a processor 1022 to implement the blocks of the method as shown in FIG. 6, which includes: sending instant messages in a group to a client: when a task conversion operation for a target message sent by the client is received, converting the target message into a to-be-processed target task; and sending the to-be-processed target task to the client. It is noted that all blocks of the method shown in FIG. 6 may be executed.

The technical solutions recorded in the examples of the present disclosure may be arbitrarily combined in a case of no conflict.

In examples provided by the present disclosure, it should be understood that the disclosed methods and intelligent devices may be implemented in other manners. The device examples described above are only illustrative, for example, the division of the units is only a logical function division, and another division manner may also be allowed during an actual implementation. For example, a plurality of units or components may be combined or integrated into another system, or some features may be neglected, or may not be executed. In addition, different components displayed or discussed may be coupled, or directly coupled or communicated with each other via some interfaces. Indirectly coupling or communication between devices or units may be in electrical or mechanical for or in another form.

The above units described as separate members may be or not be physically separated, and the members displayed as units may be or not be physical units, i.e., may be located in one place, or may be distributed to a plurality of network units. Part or all of the units may be selected according to actual requirements to implement the object of the solutions in the examples.

Further, different functional units in different examples of the present disclosure may all be integrated into a processing unit, and may also exist as a separate unit respectively. Also, two or more units may be integrated into a unit. The above integrated unit may be implemented in a hardware form, and may also be implemented in a form of hardware and software functional units.

The above descriptions are merely detailed description of the present disclosure to which the scope of protection of the present disclosure is not limited. Within the technical scope of the present disclosure, any changes or substitutions that readily occur to one skilled in the art should fall in the scope of protection of the present disclosure.

The invention claimed is:

1. A task management method based on an instant message, comprising:
   displaying, by a client, instant messages in a group on a message display interface;
   sending, by the client, a task conversion operation for a target message to a server when the task conversion operation for the target message is obtained on the message display interface, wherein the target message is any one of the instant messages displayed on the message display interface, wherein an option box pops up on the message display interface when the target message is selected, the option box including
  a first option for adding a target task, converted from the target message by the task conversion operation, to a group-to-dos display interface displaying tasks to be performed by a group, and
  a second option for converting the target task into individual-to-dos for each individual of the group,
wherein the task conversion operation is one of a first task conversion operation and a second task conversion operation, the first task conversion operation being generated when the first option is selected, and the second task conversion operation being generated when the second option is generated;
receiving, by the client, a target task to be processed and converted based on the target message from the server; and
displaying, by the client, the target task on a task display interface,
wherein the first task conversion operation indicates that
  a first user associated with the client is only a task distributor without knowing an executor of the target task, and
  other members in the group are allowed to acknowledge the target task; and
the second task conversion operation indicates that the first user is both a task distributor and an acknowledging user.

2. The method according to claim 1, wherein information of the target task at least comprises:
a task content to describe details of the target task; and
task distribution information to indicate that the target task is in an unacknowledged state or indicate an identifier of a user acknowledging the target task.

3. The method according to claim 2, wherein,
when the task conversion operation is the first task conversion operation, the task distribution information of the target task is used to indicate that the target task is in the unacknowledged state;
when the task conversion operation is the second task conversion operation, the task distribution information of the target task comprises an identifier of the first user.

4. The method according to claim 2, further comprising:
adding, by the client, an identifier of a user performing the task acknowledging operation into the task distribution information of the target task when a task acknowledging operation for the target task is obtained.

5. The method according to claim 4, wherein,
when a task acknowledging operation of a first user associated with the client for the target task is obtained, the client adds an identifier of the first user into the task distribution information; and
when a task acknowledging operation of at least one second user other than the first user in the group for the target task is obtained from the server, the client adds an identifier of each of the at least one second user into the task distribution information.

6. The method according to claim 2, further comprising:
displaying, by the client, a processing result of the target task on the task display interface when a task processing operation for the target task is obtained.

7. The method according to claim 1, wherein the task display interface and the message display interface are located in different display regions of a same page.

8. The method according to claim 1, further comprising:
displaying, by the client, context messages determined based on the target task on the message display interface or on a newly-created context display interface when a context viewing operation for the target task is obtained.

9. The method according to claim 1, further comprising:
displaying, by the client, a prompt associated with the task conversion operation on the message display interface to prompt that a user performs task conversion on the target message when the task conversion operation for the target message is obtained;
displaying, by the client, a prompt associated with the task acknowledging operation on the message display interface to prompt that a user acknowledges the target task when a task acknowledging operation for the target message is obtained; and
displaying, by the client, a prompt associated with the task processing operation on the message display interface to prompt that a user processes the target task when a task processing operation for the target message is obtained.

10. A non-transitory computer storage medium storing computer instructions, wherein the computer instructions are executed by the processor to implement the method according to claim 1.

11. A task management method based on an instant message, comprising:
sending, by a server, instant messages in a group to a client;
converting, by the server, a target message into a target task to be processed when a task conversion operation for the target message sent by the client is received, wherein the target message is any one of the instant messages in the group,
wherein an option box pops up on a message display interface when the target message is selected, the option box including
  a first option for adding the target task, converted from the target message by the task conversion operation, to a group-to-dos display interface displaying tasks to be performed by the group, and
  a second option for converting the target task into individual-to-dos for each individual of the group,
wherein the task conversion operation is one of a first task conversion operation and a second task conversion operation, the first task conversion operation being generated when the first option is selected, and the second task conversion operation being generated when the second option is generated; and
sending, by the server, the target task to be processed to the client,
wherein the first task conversion operation indicates that
  a first user associated with the client is only a task distributor without knowing an executor of the target task, and
  other members in the group are allowed to acknowledge the target task; and
the second task conversion operation indicates that the first user is both a task distributor and an acknowledging user.

12. The method according to claim 11, wherein information of the target task at least comprises:
a task content to describe details of the target task; and
task distribution information to indicate that the target task is in an unacknowledged state or indicate an identifier of a user acknowledging the target task.

13. The method according to claim 12, further comprising:
adding, by the server, the identifier of the user acknowledging the target task into the task distribution information of the target task when a task acknowledging operation for the target task sent by the client is received.

14. The method according to claim 12, further comprising:
sending, by the server, a processing result of the target task to the client when a task processing operation for the target task sent by the client is received.

15. The method according to claim 11, further comprising:
querying, by the server, context messages of the instant message associated with the target task when a context viewing operation for the target task sent by the client is received; and
sending, by the server, the context messages to the client.

16. A server, comprising:
a memory storing computer instructions; and
a processor; and
wherein the computer instructions stored on the memory are executable by the processor to implement the method according to claim 11.

17. A non-transitory computer storage medium storing computer instructions, wherein the instructions are executed by the processor to implement the method according to claim 11.

18. A client, comprising:
a memory storing computer instructions; and
a processor;
the computer instructions stored on the memory being executable by the processor to:
display instant messages in a group on a message display interface;
send a task conversion operation for a target message to a server when the task conversion operation for the target message is obtained on the message display interface, wherein the target message is any one of the instant messages displayed on the message display interface,
wherein an option box pops up on the message display interface when the target message is selected, the option box including
a first option for adding a target task, converted from the target message by the task conversion operation, to a group-to-dos display interface displaying tasks to be performed by the group, and
a second option for converting the target task into individual-to-dos for each individual of the group,
wherein the task conversion operation is one of a first task conversion operation and a second task conversion operation, the first task conversion operation being generated when the first option is selected, and the second task conversion operation being generated when the second option is generated;
receive a target task to be processed and converted based on the target message from the server; and
display the target task on a task display interface,
wherein the first task conversion operation indicates that
a first user associated with the client is only a task distributor without knowing an executor of the target task, and
other members in the group are allowed to acknowledge the target task; and
the second task conversion operation indicates that the first user is both a task distributor and an acknowledging user.

19. The method of claim 18, wherein information of the target task at least comprises:
a task content to describe details of the target task; and
task distribution information to indicate that the target task is in an unacknowledged state or indicate an identifier of a user acknowledging the target task.

20. The method of claim 19, wherein,
when the task conversion operation is the first task conversion operation, the task distribution information of the target task is used to indicate that the target task is in the unacknowledged state;
when the task conversion operation is the second task conversion operation, the task distribution information of the target task comprises an identifier of the first user.

* * * * *